US008418339B2

(12) United States Patent
Barnowski et al.

(10) Patent No.: US 8,418,339 B2
(45) Date of Patent: Apr. 16, 2013

(54) METHOD FOR CONSTRUCTING A SUPPORT RING IN A CURVED WALL

(75) Inventors: Wolfgang Barnowski, Niedermhausen (DE); Manfred Moller, Wiesbaden-Auringen (DE); Gabriele Roth, Frankfurt am Main (DE)

(73) Assignee: Paul Wurth Refractory & Engineering GmbH (DE)

( * ) Notice: Subject to any disclaimer, the term of this patent is extended or adjusted under 35 U.S.C. 154(b) by 494 days.

(21) Appl. No.: 12/597,231

(22) PCT Filed: Apr. 30, 2008

(86) PCT No.: PCT/EP2008/055357
§ 371 (c)(1),
(2), (4) Date: Jul. 19, 2010

(87) PCT Pub. No.: WO2008/135505
PCT Pub. Date: Nov. 13, 2008

(65) Prior Publication Data

US 2010/0281672 A1 Nov. 11, 2010

(30) Foreign Application Priority Data

May 7, 2007 (EP) .................................... 07107650

(51) Int. Cl.
*B23P 17/00* (2006.01)

(52) U.S. Cl.
USPC ...................................................... 29/407.05

(58) Field of Classification Search .................... 29/428, 29/425, 897, 407.05, 407.1, 412, 416, 453, 29/703; 432/119, 103, 105
See application file for complete search history.

(56) References Cited

U.S. PATENT DOCUMENTS 3,346,248 A * 10/1967 Martinet et al. .............. 432/119
3,802,833 A 4/1974 Weber
5,704,782 A * 1/1998 Schulze et al. ................ 432/119

FOREIGN PATENT DOCUMENTS

GB 391858 5/1933
KR 1020040056593 7/2004

OTHER PUBLICATIONS

International Search Report PCT/EP2008/055357; Dated Jul. 18, 2008.
Patrick Derungs., "Highly flexible automated and integrated bricklaying systems for steel converters refractory liners" vol. 2, 1992, XP008083821.
CH. Hanser., et al., "Automatisiertes Mauern, Automated Brick-Wall Production" vol. 113, No. 7/8, Jul. 1996—XP000633391.

* cited by examiner

*Primary Examiner* — John C Hong
(74) *Attorney, Agent, or Firm* — Cantor Colburn LLP

(57) ABSTRACT

A method for constructing a support ring in a curved wall, in particular around an opening in a curved wall of a hot blast stove, where the method includes providing a plurality of standardized wedge-shaped bricks with side faces having tongue and groove profiles for cooperating with the side faces of the neighboring bricks, the thickness of the brick in the axial direction being in excess of the desired end thickness of the brick, and determining the intended location of each individual brick in the curved wall and determining, based on the intended location, the location of a front cut line and a rear cut line for shaping the front and rear faces of the brick, where the front and rear faces of the brick are then shaped in accordance with the above determined front and rear cut lines by a cutting tool.

19 Claims, 3 Drawing Sheets

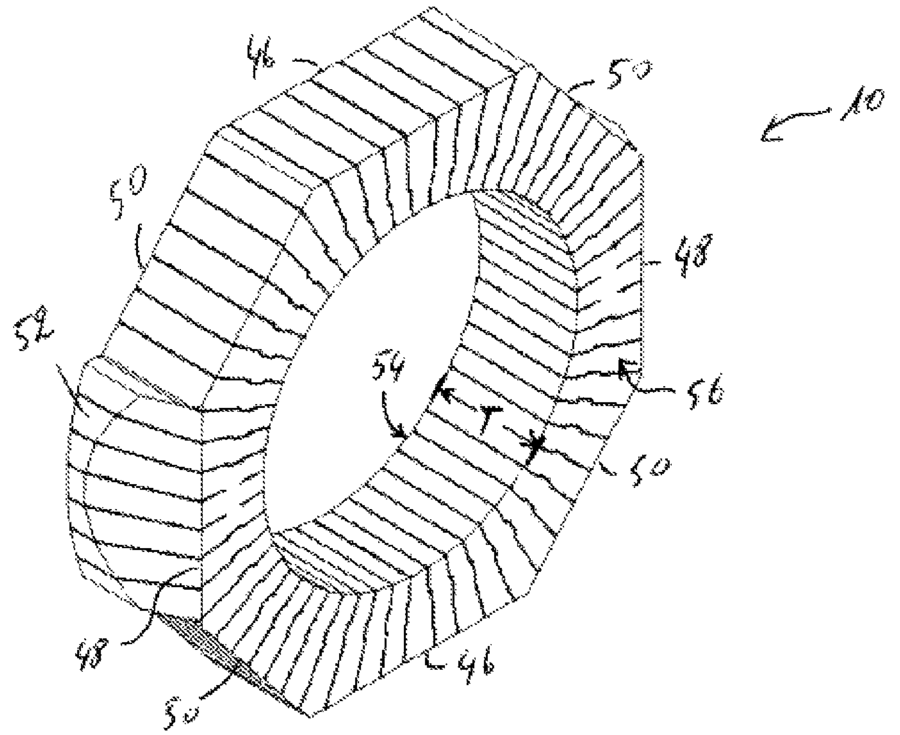
Fig.3
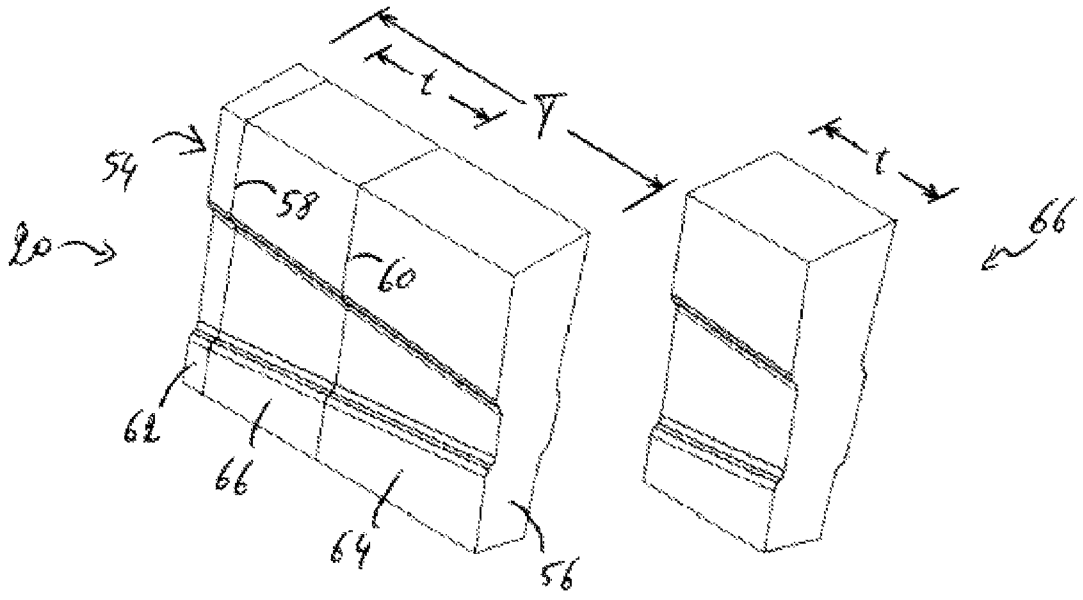
Fig 4
Fig.5

METHOD FOR CONSTRUCTING A SUPPORT RING IN A CURVED WALL

TECHNICAL FIELD

The present invention relates to a method for constructing a support ring in a curved wall and more particularly to a method for constructing a support ring of refractory material around an opening in a curved wall of a hot blast stove or a blast furnace.

BRIEF SUMMARY OF RELATED ART

The preheating of air for blast furnaces is conventionally carried out in adjacent regenerative heaters known as hot blast stoves. These stoves generally consist, for a stove with internal combustion chamber, of a cylindrical refractory wall and an internal vertical partition wall partitioning the stove into a combustion chamber and a checker chamber containing checker bricks or, for a stove with external combustion chamber, of two cylindrical refractory lined chambers with a connection dome. Air and fuel is introduced through one or two openings into a so-called ceramic burner or metallic burner in the combustion chamber for burning and the resultant combustion gasses flow upwardly from the combustion chamber over to the combustion chamber downwardly through the checker work chamber until they are finally exhausted at the base of that chamber. After the checker bricks have reached a sufficiently high temperature, the direction of fluid flow in the stove is reversed. A cold blast is introduced at the base of the checker chamber and after absorbing heat from the checker bricks this air passes over the partition wall and through the combustion chamber, where it leaves the stove through a hot blast outlet in the shell of the stove to be fed to the blast furnace.

Because of the high temperatures present at the hot blast outlet, the off-gas outlet or the burner inlets, these openings are generally peripherically surrounded by a refractory support ring consisting of one or more rings of refractory bricks.

Due to the curvature of the outer wall of the hot blast stoves, a large variety of brick shapes is required to construct such a support ring. The construction of such support rings is therefore generally an expensive and time consuming undertaking.

A number of solutions have been proposed for producing such a support ring.

One method is to fill wooden or plastic moulds with a high alumina material then proceed to hand-ramming and firing. The main disadvantage of this method is that the resulting bricks are generally of poorer quality.

Another method involves forming whole sections of the ring in a mould, wherein steel plates delimit individual bricks. This method leads to a support ring with thick mortar joints between the bricks, which is not desired. Furthermore, the steel plates may bend thereby compromising the strength of the whole structure. Also, if one brick breaks, the whole section of the support ring must be replaced, leading to unnecessary waste.

Yet another method is to hydraulically press bricks in individual steel moulds. Although this method allows the production of high quality bricks, the costs involved are very high.

As the production of such a large variety of brick shapes is either of poorer quality, or too expensive, it is necessary to provide a method wherein the number of different brick shapes can be reduced.

According to a method proposed in U.S. Pat. No. 4,478,575, only one type of brick is used for the construction of the support ring. This method uses bricks having a particularly shape and assembling these bricks to construct the support ring. The brick has a wedge-shaped cross-section in more than one direction. With this method, the different wedge angles of the brick are crucial to obtaining the desired support ring. Although the method allows easy and fast construction of a support ring, this is only true if the bricks used have the correct shape. A particular shape of brick is needed for particular opening diameters and stove wall curvatures. Before the support ring can be constructed, the wedge shaped bricks have to be designed and produced according to the particular opening diameter and stove curvature of the opening to be strengthened. The design of the bricks is a rather complex undertaking and any error in the wedge angle means that the bricks cannot be used for that particular support ring. They then have to be discarded and the whole process has to start from scratch. The potential for waste is consequently very high.

BRIEF SUMMARY OF THE INVENTION

The invention provides a faster and more economical method for constructing a support ring in a curved wall.

The invention proposes a method for constructing a support ring in a curved wall, in particular around an opening in a curved wall of a hot blast stove. According to the invention, the method comprising the steps of: (a) providing a plurality of standardised wedge-shaped bricks, (b) determining the intended location of each individual brick in the curved wall; (c) determining, based on the intended location of an individual brick in the curved wall, the location of a front cut line for shaping the front face of the brick and the location of a rear cut line for shaping the rear face of the brick; and (d) shaping the front and rear faces of the brick in accordance with the above determined front and rear cut lines by means of a cutting tool. The standardised wedge-shaped bricks provided in step (a) have a front face and an opposite rear face; an inner base and an opposite outer base, the inner base being smaller than the outer base and being directed towards the centre of the support ring; and two side faces for connecting to neighbouring bricks, the side faces being provided with tongue and groove profiles for cooperating with the side faces of the neighbouring bricks. An axial direction of a brick is defined as passing through the front and rear faces and being parallel to the axis of the support ring once the plurality of bricks are laid out to form the support ring. A radial direction of a brick is defined as passing through the inner and outer bases and being perpendicular to the axis of the support ring once the plurality of bricks are laid out to form the support ring and extending from the centre of the support ring towards the brick. According to one important aspect of the invention, the brick has a thickness in the axial direction that is in excess of the desired end thickness of the brick.

The present method allows the use of standardised bricks for the construction of the support ring, irrespective of the curvature of the stove wall. The bricks, which can be prefabricated and stored ready for use, have a wedge shaped cross section defining an opening diameter of the support ring. Initially, the curvature of the stove wall is not taken into account. By providing bricks that have a thickness in the axial direction that is in excess of their desired end thickness, the bricks can be shaped into form by cutting. The present method proposes individually shaping of each brick based on its intended position in the support ring. The shaping of the individual bricks allows the adaptation of the support ring to the curvature of the stove wall.

The method according to the present invention hence a faster and more economical way of constructing a support ring in a curved wall.

Preferably, after step (d), the method comprises the additional step of placing and fixing the individual bricks in their previously determined intended location in the curved wall.

According to one preferred embodiment, in step (b), the intended location of an individual brick in the curved wall is computed with the aid of a computer program.

According to another preferred embodiment, step (b) comprises virtually and/or physically laying out the plurality of bricks so as to form a support ring preform. A computer program can be used to virtually lay out the bricks and determine the intended position of the brick in the support ring and in the curved wall. Alternatively, the bricks can be laid out physically by placing them next to each other on the floor an form the support ring preform.

Advantageously, the locations of the front cut line and the rear cut line are, in step (c), computed with the aid of a computer program. Using a cutting tool, the brick can then be cut along these front and rear cut lines to remove front and rear portions of the brick. The remaining middle portion of the brick represents the shaped brick having the desired shape and dimensions to be placed in the curved wall.

The outer bases of the individual bricks form an outer edge of the support ring preform. Preferably, the method comprising the further step of cutting the outer edge of the support ring preform to a predetermined shape. Advantageously, the outer edge is cut into straight sections. Horizontal and vertical sections can easily be incorporated in existing brickwork. The incorporation of intermediate sections can also be easily achieved. Preferably, the intermediate sections are at an angle of 45° with respect to the horizontal. The use of brickwork portions having one side face cut at an angle of 45° facilitates the integration of such intermediate sections in the brickwork of the hot blast stove.

The outer edge of the support ring preform is preferably cut before step (d).

The tongue and groove profiles of the side faces are preferably irregular, thereby ensuring that the bricks remain in a predetermined relationship one with respect to the other.

The tongue and groove profiles of the side faces are advantageously wedge-shaped and extend in a substantially axial direction. Such tongue and groove profiles prevent a particular brick from moving in an axial inward movement due to the connection to a neighbouring brick on one side. An axial outward movement is prevented by the tongue and groove connection to a neighbouring brick on the other side. A radial outward movement is also prevented by the substantially axial tongue and groove connection. Finally, a radial inward movement is prevented by the substantially axial tongue and groove connection and by the wedge-shape of the brick. Hence, once a brick is sandwiched between two neighbouring bricks, movement of that brick in any direction is prevented.

According to a preferred embodiment, at least one starter brick is provided, the starter brick comprising groove profiles on both its side faces; and at least one end brick is provided, the end brick comprising tongue profiles on both its side faces. The use of starter and end bricks allows the completion of the support ring by axial introduction of the end brick. The construction of the support ring is thereby simplified.

The plurality of standardised wedge-shaped bricks may comprise clockwise bricks with a groove profile on their first side face and a tongue profile on their second side face; and anticlockwise bricks with a tongue profile on their first side face and a groove profile on their second side face. Such clockwise bricks and anticlockwise bricks are of particular interest in combination with the above-mentioned starter and end bricks.

According to a particular preferred embodiment of the invention, the support ring (preform) comprises: (a) a first starter brick and a diametrically opposed second starter brick; (b) a first end brick and a diametrically opposed second end brick, the end bricks being arranged half way between the starter bricks; (c) a plurality of clockwise bricks arranged between the first starter brick and the first end brick and between the second starter brick and the second end brick; and (d) a plurality of anticlockwise bricks arranged between the first starter brick and the second end brick and between the second starter brick and the first end brick.

The first and second starter bricks can be placed on opposite side ends of the support ring (preform). Clockwise and anticlockwise bricks can then respectively be connected thereto on both sides so as to construct the support ring (preform). Lastly, just before the clockwise and anticlockwise bricks meet half way between the first and second starter bricks, the first and second end bricks can be inserted to complete the support ring (preform).

A first group of bricks may have a first wedge angle and at least one second group of bricks may have a second wedge angle different from the first wedge angle, various inner diameters of the support ring being obtained by various combinations of bricks from the first group and bricks from the at least one second group. By altering the number and frequency of bricks of the second group with respect to bricks of the first group, the inner diameter of the support ring can be chosen. The use of more than one second group of bricks, each with its own wedge angle, allows the use of bricks of at least three different wedge angles, thereby further adapting the inner diameter of the support ring.

According to a further embodiment of the invention, the step of virtually and/or physically laying out the plurality of bricks so as to form a support ring preform comprises dividing the support ring preform into two diametrically opposed lower sections and two diametrically opposed upper sections; and laying out the bricks in such a way that the two upper sections are in an axially raised relationship with respect to the two lower sections. Intermediate sections may additionally be located between the lower and upper sections. This allows the support ring preform to be laid out so as to roughly correspond to the curvature of the curved wall into which the support ring is to be inserted. The size of front and rear portions to be removed from the bricks may thereby be reduced.

Advantageously, the individual bricks are press-formed, preferably hydraulically press-formed, e.g. in steel moulds. This ensures the manufacturing of high quality bricks.

BRIEF DESCRIPTION OF THE FIGURES

The present invention will be more apparent from the following description of some not limiting embodiments with reference to the attached drawings. In these drawings, wherein identical reference numerals are used to indicate identical or similar elements.

FIG. 3: is a perspective view of the support ring preform of FIG. 1 wherein the outer edge has been cut to size;

FIG. 4: is a perspective view of the brick of FIG. 2 showing the front and read cut lines;

FIG. 5: is a perspective view of the brick of FIG. 2 with the front and rear portions cut away;

DETAILED DESCRIPTION OF THE DRAWINGS

Figure 1:
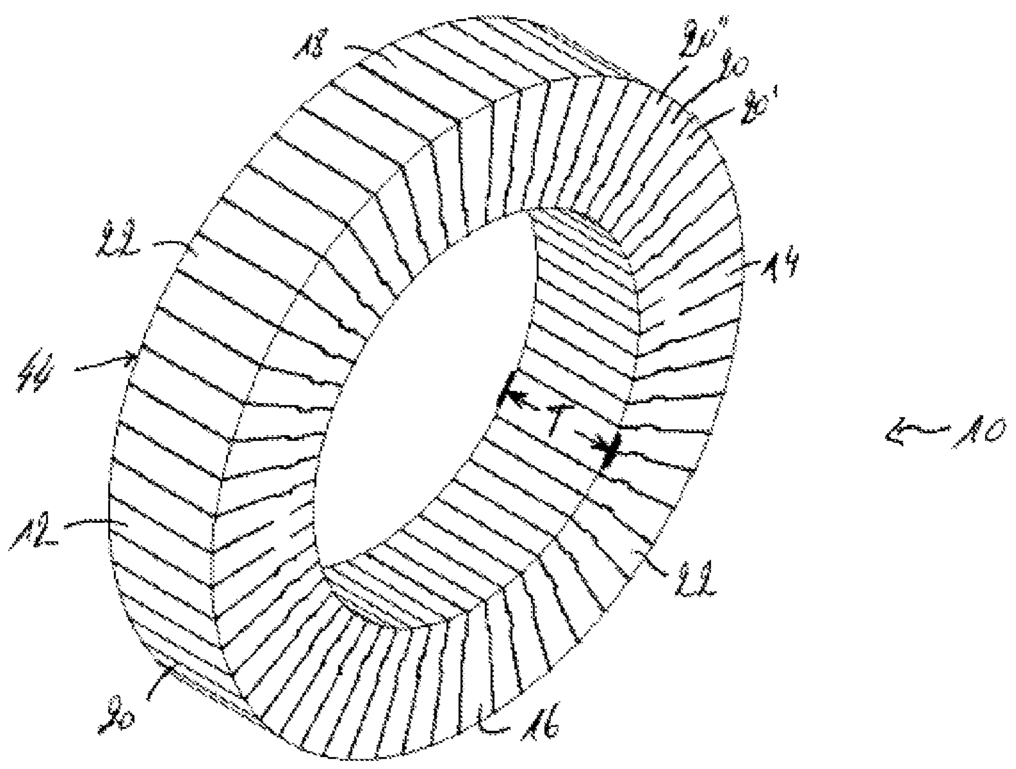
FIG. 1: is a perspective view of a support ring preform constructed using the method according to the present invention.

FIG. 1 shows a support ring preform 10 constructed, according to a preferred embodiment of the invention, from a plurality of wedge-shaped bricks. In this embodiment, the support ring preform 10 comprises a first starter brick 12 and a diametrically opposed second starter brick 14 and a first end brick 16 and a diametrically opposed second end brick 18, the end bricks 16, 18 being arranged half way between the starter bricks 12, 14. Between the starter and end bricks 12, 14, 16, 18, a plurality of clockwise and anticlockwise bricks 20, 22 are arranged to complete the support ring preform 10.

More particularly, clockwise bricks 20 are arranged between the first starter brick 12 and the first end brick 16 and between the second starter brick 14 and the second end brick 18, whereas anticlockwise bricks 22 are arranged between the first starter brick 12 and the second end brick 18 and between the second starter brick 14 and the first end brick 16. The difference between clockwise and anticlockwise bricks will become apparent here below.

Figure 2:
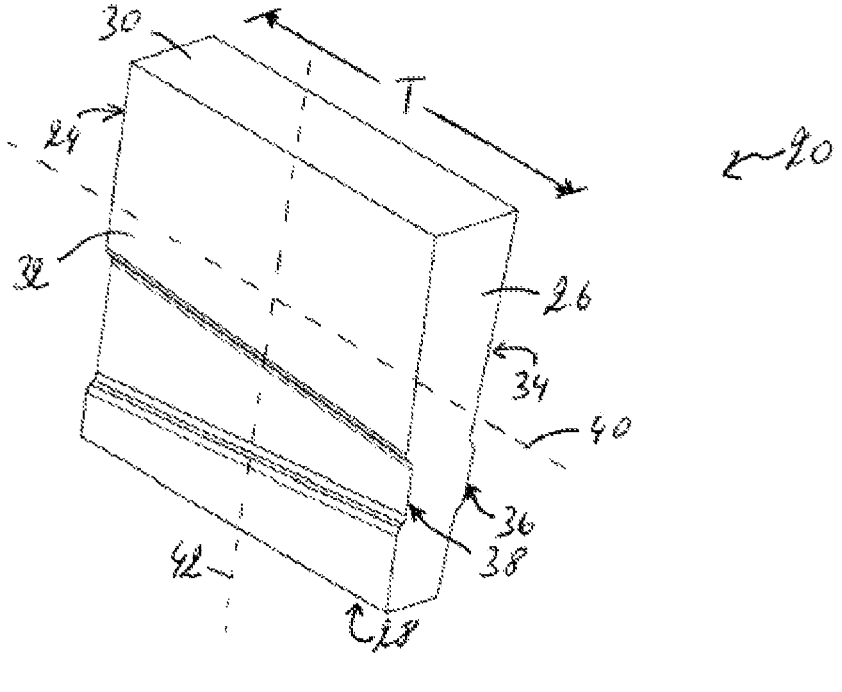
FIG. 2: is a perspective view of one of the standardised bricks used for in the construction of the support ring preform of FIG. 1.

In essence, all of the wedge-shaped bricks 12, 14, 16, 18, 20, 22 of the support ring preform 10 have substantially identical shape and dimension. For the purpose of more closely describing these bricks, a perspective view of a clockwise brick 20 is represented in FIG. 2. Such a clockwise brick 20 has a front face 24 and an opposite rear face 26, an inner base 28 and an opposite outer base 30, the inner base 28 being smaller than the outer base 30 and being directed towards the centre of the support ring preform 10. The wedge-shaped clockwise brick 20 also has two side faces 32, 34 for connecting to neighbouring bricks 20', 20", the side faces 32, 34 being provided with tongue and groove profiles 36, 38 for cooperating with the side faces of neighbouring clockwise bricks 20', 20". The clockwise brick 20 comprises an axial direction 40 passing through the front and rear faces 24, 26, the axial direction 40 being parallel to the axis of the support ring preform 10, and a radial direction 42 passing through the inner and outer bases 28, 30, the radial direction 42 being perpendicular to the axis of the support ring preform 10 and extending from the centre of the support ring preform towards the clockwise brick 20. According to an important aspect of the present invention, the thickness T of the clockwise brick 20 in the axial direction 40 is in excess of the desired end thickness t of the clockwise brick 20.

According to an important aspect of the present invention, the side faces 32, 34 have tongue and groove profiles 36, 38 that are in a substantially axial direction 40 and extend from the front face 24 to the rear face 26 of the brick 20, while narrowing in direction of the rear face 26. Once a clockwise brick 20 is sandwiched between two neighbouring clockwise bricks 20', 20", movement of that brick 20 in any direction is prevented. An axial inward movement is prevented by the tongue and groove connection to one neighbouring clockwise brick 20', whereas an axial outward movement is prevented by the tongue and groove connection to the other neighbouring clockwise brick 20". A radial outward movement is prevented by the substantially axial tongue and groove connection and a radial inward movement is prevented by the wedge-shape of the brick 20.

It should be noted that, although the above description of a wedge-shaped brick is made in reference to a clockwise brick 20, the description is also valid for the starter bricks 12, 14, the end bricks 16, 18 and the anticlockwise bricks 22. However, the bricks may differ in the arrangement of their tongue and groove profiles 36, 38.

A starter brick 12, 14 may comprise a groove profile 38 on both its side faces 32, 34, while an end brick 16, 18 may comprise a tongue profile 36 on both its side faces 32, 34. Clockwise bricks 20 have a groove profile 38 on a first side face 32 and a tongue profile 36 on a second side face 34, while anticlockwise bricks 22 have a tongue profile 36 on a first side face 32 and a groove profile 38 on a second side face 34.

In the embodiment of FIG. 1, the first and second starter bricks 12, 14 are placed on opposite side ends of the support ring preform 10. Clockwise and anticlockwise bricks 20, 22 are then respectively connected thereto on both sides so as to construct the support ring preform 10. Lastly, just before the clockwise and anticlockwise bricks 20, 22 meet half way between the first and second starter bricks 12, 14, the first and second end bricks 16, 18 are inserted to complete the support ring preform 10.

It should be noted however that it is in principle possible to use only one type of brick, e.g. each having a first side face 32 with a tongue profile 36 and a second side face 34 with a groove profile 38.

According to the present invention, once the support ring preform 10 has been laid out, the latter has to be shaped to fit the opening in a curved wall (not shown), e.g. of a hot blast stove.

In a first shaping step, an outer edge 44 of the support ring preform 10, which is formed by the outer bases 30 of the individual bricks 12, 14, 16, 18, 20, 22, is cut so as to be able to fit the opening in the curved wall. Such a support ring preform 10 is represented in FIG. 3. Preferably, the outer edge 44 is cut into straight sections comprising horizontal sections 46, vertical sections 48 and intermediate sections 50 at an angle of 45° with respect to the horizontal. One or more of the sections may comprise protrusions 52, as e.g. shown in FIG. 2, for adaptation in the curved wall of the hot blast stove. The horizontal and vertical sections 46, 48 are particularly well adapted to be integrated in the standard brickwork of the curved wall. The intermediate sections 50 can also easily be integrated in the standard brickwork of the curved wall with the help of brickwork portions (not shown) that have one side face cut at an angle of 45°.

According to an important aspect of the invention, the bricks of the support ring preform 10 have a thickness T in the axial direction 40, which exceeds the desired end thickness t of the support ring. The front and rear sides 54, 56 of the support ring preform 10, which are respectively formed by the front and rear faces 24, 26 of the individual bricks 12, 14, 16, 18, 20, 22, are essentially flat, as can be seen in FIGS. 1 and 3. In order to adapt the front and rear sides 54, 56 to the curvature of the curved wall, the front and rear sides 54, 56 have to be shaped. This is achieved by cutting away front and rear portions 62, 64 of each brick 12, 14, 16, 18, 20, 22 according to precise cut lines.

The shaping of the individual bricks 12, 14, 16, 18, 20, 22 will again be described by referring to a clockwise brick 20 as shown in FIG. 4.

In a first step, the intended location of a particular brick, e.g. of the clockwise brick 20, in the curved wall is determined. This can be done with the help of a computer program.

Based on the determined intended location of the clockwise brick 20 in the curved wall, the computer program then determines the location of front and rear cut lines 58, 60 for shaping the clockwise brick 20. Using a cutting tool (not shown), the clockwise brick 20 is finally cut along the front and rear cut lines 58, 60 to remove the front and rear portions 62, 64 of the clockwise brick 20. The remaining middle portion 66 of the clockwise brick 20, as shown in FIG. 5, represents the shaped clockwise brick 20 having the desired end thickness t and the shape adapted to its intended location in the curved wall.

Figure 6:
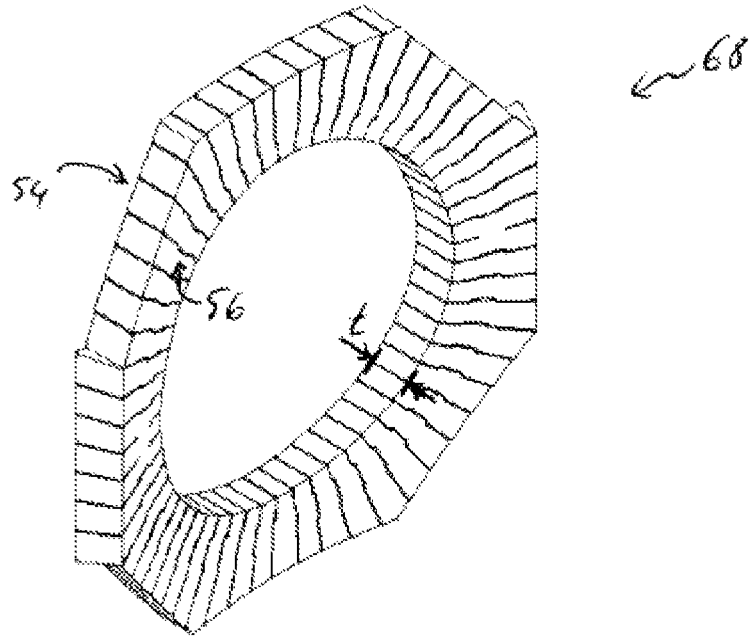
FIG. 6: is a perspective view of an assembled support ring ready for placement in a curved wall.

After the individual bricks 12, 14, 16, 18, 20, 22 have been shaped according to the above method, they can be assembled to a shaped support ring 68 as shown in FIG. 6.

The curvature of the rear side 56 of the shaped support ring 68 corresponds to the inner curvature of the curved wall of the hot blast stove and the curvature of the front side 54 of the shaped support ring 64 corresponds to the outer curvature of the curved wall of the hot blast stove. After placing and fixing the individual bricks 12, 14, 16, 18, 20, 22 in their determined intended location in the curved wall, the shaped support ring 64 is flush with the curved wall, both on the inside and the outside.

A particular advantage of the present method is that the present method allows the construction of support rings for a large variety of different curvatures.

As will be readily understood, the inner diameter of the support ring is determined by the wedge angle A of the wedge-shaped bricks. According to the embodiments shown in FIGS. 1 to 6, all of the bricks 12, 14, 16, 18, 20, 22 have an identical wedge angle A.

Although not shown in the accompanying figures, some of the bricks 12, 14, 16, 18, 20, 22 may have a different wedge angle A'. The use of two different wedge angles A, A', allows adaptation of the inner diameter of the support ring, depending on the arrangement of the different bricks. It should be noted that the use of more than two different wedge angles is also possible to further adapt the inner diameter of the support ring.

In the interest of maintaining the variety of different types of bricks as small as possible, only two different angles are preferred. Different combinations of such bricks may be used to obtain the desired inner diameter.

Figure 7:
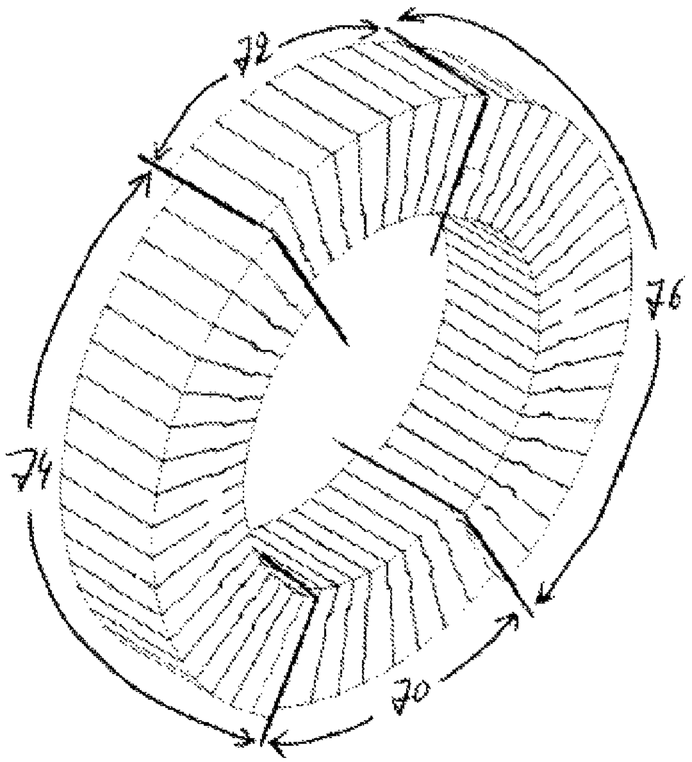
FIG. 7: is a perspective view of a support ring preform constructed using the method according to a second aspect present invention.

A further embodiment of the invention is represented in FIG. 7. This figure shows a support ring preform, which has been divided into two diametrically opposed lower sections 70, 72 and two diametrically opposed upper sections 74, 76. The bricks 12, 14, 20, 22 of the upper sections 74, 76 are in an axially raised relationship with respect to the bricks 16, 18, 20, 22 of the lower sections 70, 72. The axially raised relationship between two neighbouring bricks may easily be achieved by enlarging the groove profile between the two neighbouring bricks. Such an arrangement allows a rough adaptation of the support ring preform to the curvature of the curved wall before the bricks are shaped. The size of the front and rear portions 62, 64 to be removed from each brick can be reduced and, consequently, waste is reduced.

Although not shown in the accompanying figures, intermediate sections may be located between the lower sections 70, 72 and the upper sections 74, 76. Such intermediate sections may be advantageous depending on the curvature of the curved wall of the hot blast stove.

Finally, it should be noted that the bricks can be shaped using any adequate cutting tool such as e.g. a wire saw.

The invention claimed is:

1. A method for constructing a support ring in a curved wall; the method comprising the steps of:

(a) providing a plurality of standardized wedge-shaped bricks, the bricks having:
  - a front face and an opposite rear face,
  - an inner base and an opposite outer base, the inner base being smaller than the outer base and being directed towards a centre of the support ring,
  - two side faces for connecting to neighbouring bricks, the side faces being provided with tongue and groove profiles for cooperating with the side faces of the neighbouring bricks,
  - an axial direction passing through the front and rear faces, the axial direction being parallel to an axis of the support ring once the plurality of bricks are laid out to form the support ring,
  - a radial direction passing through the inner and outer bases, the radial direction being perpendicular to the axis of the support ring once the plurality of bricks are laid out to form the support ring and extending from the centre of the support ring towards the brick,
  - a thickness of the brick in the axial direction, the thickness being in excess of a desired end thickness of the brick;

(b) determining the intended location of each individual brick in the curved wall;

(c) determining, based on the intended location of an individual brick in the curved wall,
  - the location of a front cut line for shaping the front face of the brick, and
  - the location of a rear cut line for shaping the rear face of the brick;

(d) shaping the front and rear faces of the brick in accordance with the above determined front and rear cut lines by means of a cutting tool.

2. The method according to claim 1, wherein, after step (d), the method comprises the step of placing and fixing the individual bricks in their previously determined intended location in the curved wall.

3. The method according to claim 1, wherein, in step (b), the intended location of an individual brick in the curved wall is computed using a computer program.

4. The method according to claim 1, wherein, step (b) comprises virtually and/or physically laying out the plurality of bricks so as to form a support ring preform.

5. The method according to claim 1, wherein, in step (c), the locations of the front cut line and the rear cut line are computed using a computer program.

6. The method according to claim 1, wherein outer bases of the individual bricks form an outer edge of the support ring preform, the method further comprising the step of cutting the outer edge of the support ring preform to a predetermined shape.

7. The method according to claim 6, wherein the outer edge of the support ring preform is cut before step (d).

8. The method according to claim 1, wherein the tongue and groove profiles of the side faces are irregular.

9. The method according to claim 1, wherein the tongue and groove profiles of the side faces are wedge-shaped and extend in a substantially axial direction.

10. The method according to claim 1, at least one starter brick is provided, the starter brick comprising groove profiles on both its side faces.

11. The method according to claim 1, at least one end brick is provided, the end brick comprising tongue profiles on both its side faces.

12. The method according to claim 1, wherein said support ring preform comprises:

a first starter brick and a diametrically opposed second starter brick;

a first end brick and a diametrically opposed second end brick, the end bricks being arranged half way between the starter bricks;

a plurality of clockwise bricks arranged between the first starter brick and the first end brick and between the second starter brick and the second end brick; and a plurality of anticlockwise bricks arranged between the first starter brick and the second end brick and between the second starter brick and the first end brick.

13. The method according to claim 12, wherein said clockwise bricks have a groove profile on its first side face and a tongue profile on its second side face; and said anticlockwise bricks have a tongue profile on its first side face and a groove profile on its second side face.

14. The method according to claim 1, wherein a first group of bricks have a first wedge angle and at least one second group of bricks have a second wedge angle different from the first wedge angle, various inner diameters of the support ring being obtained by various combinations of bricks from the first group and bricks from the at least one second group.

15. The method according to claim 1, wherein the step of virtually and/or physically laying out the plurality of bricks so as to form a support ring preform comprises:

dividing the support ring preform into two diametrically opposed lower sections and two diametrically opposed upper sections, laying out the bricks in such a way that the two upper sections are in an axially raised relationship with respect to the two lower sections.

16. The method according to claim 15, wherein at least one intermediate section is located between the lower and upper sections.

17. The method according to claim 1, wherein the individual bricks are press-formed.

18. The method according to claim 1, wherein the individual bricks hydraulically press-formed.

19. The method according to claim 1, wherein said curved wall is a curved wall of a hot blast stove or a blast furnace.

* * * * *